United States Patent
Matzen et al.

(10) Patent No.: US 11,235,732 B2
(45) Date of Patent: Feb. 1, 2022

(54) BELT RETRACTOR FOR A SEAT BELT DEVICE OF A MOTOR VEHICLE

(71) Applicant: Autoliv Development AB, Vargarda (SE)

(72) Inventors: Frank Matzen, Hamburg (DE); Geert Wittenberg, Norderstedt (DE); Giuliano Begovic, Elmshorn (DE); David Winheim, Hamburg (DE); Sven Krambeer, Halstenbek (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 349 days.

(21) Appl. No.: 16/504,229

(22) Filed: Jul. 6, 2019

(65) Prior Publication Data
US 2020/0010047 A1 Jan. 9, 2020

(30) Foreign Application Priority Data

Jul. 6, 2018 (DE) .......................... 102018211226.6

(51) Int. Cl.
*B60R 22/40* (2006.01)
(52) U.S. Cl.
CPC .................................... *B60R 22/40* (2013.01)
(58) Field of Classification Search
CPC ......... B60R 22/34; B60R 22/40; B60R 22/46; B60R 22/4628
See application file for complete search history.

(56) References Cited

U.S. PATENT DOCUMENTS

| 7,108,114 | B2 | 9/2006 | Mori et al. | |
| 7,934,673 | B2 * | 5/2011 | Saito | B60R 22/44 |
| | | | | 242/374 |
| 10,046,734 | B2 | 8/2018 | Lucht et al. | |
| 2016/0250994 | A1 * | 9/2016 | Lucht | B60R 22/46 |
| | | | | 242/383.5 |

FOREIGN PATENT DOCUMENTS

| DE | 10059227 C1 | 3/2002 |
| EP | 1663737 B1 | 10/2008 |

* cited by examiner

*Primary Examiner* — Sang K Kim
(74) *Attorney, Agent, or Firm* — Dickinson Wright PLLC

(57) ABSTRACT

A belt retractor for a motor vehicle seat belt device, with a rotatably mounted belt reel onto which a seat belt is wound, and a belt tensioner with a drive wheel (1), which drives the belt reel in the event of an activation. A positively controlled tensioner coupling transfers the drive movement from the drive wheel (1) onto the belt reel. At least one coupling pawl (2,3) mounted on the drive wheel (1) and which is moved into and out of engagement with a toothing (20) rotationally fixed in relation to the belt reel to establish and disconnect a rotational connection of the drive wheel (1) with the belt reel. A friction ring (4) has a control arm (11) coupled with the coupling pawl (2,3), wherein in the event of an activation of the belt tensioner, the friction ring (4) performs a relative movement to the drive wheel (1) by frictional forces and, controls via the control arm (11) the movement of the coupling pawl (2,3) into engagement and disengagement with the toothing (20). The friction ring (4) and/or the coupling pawl (2,3) has a blocking contour (12), positioned such that the coupling pawl (2,3) abuts thereon after the disengaging movement out of the toothing (20) and is blocked in the direction of a repeated engagement movement into the toothing (20).

11 Claims, 15 Drawing Sheets

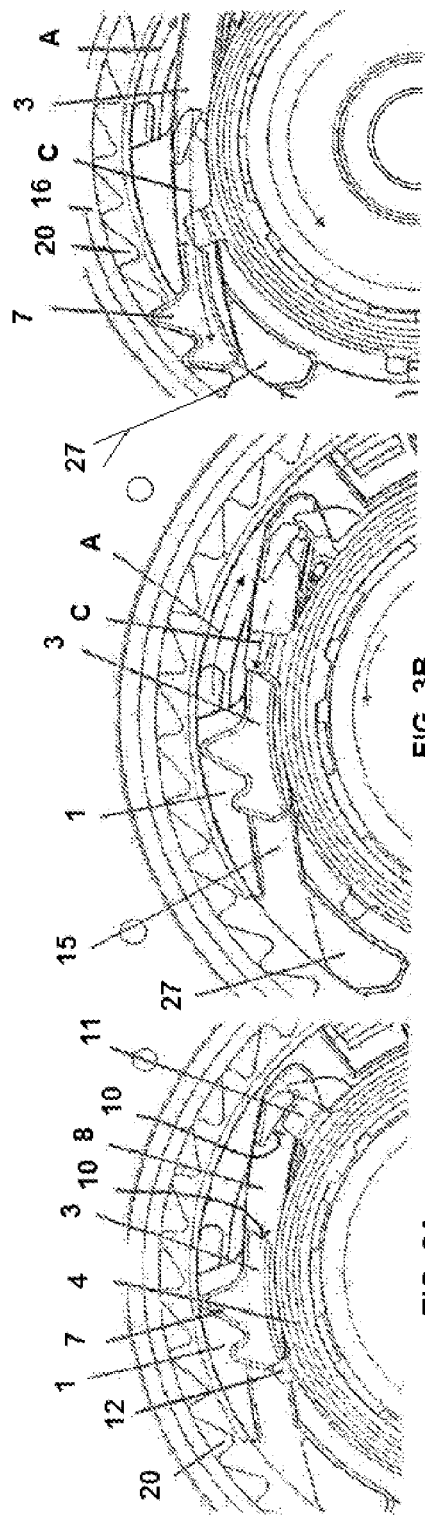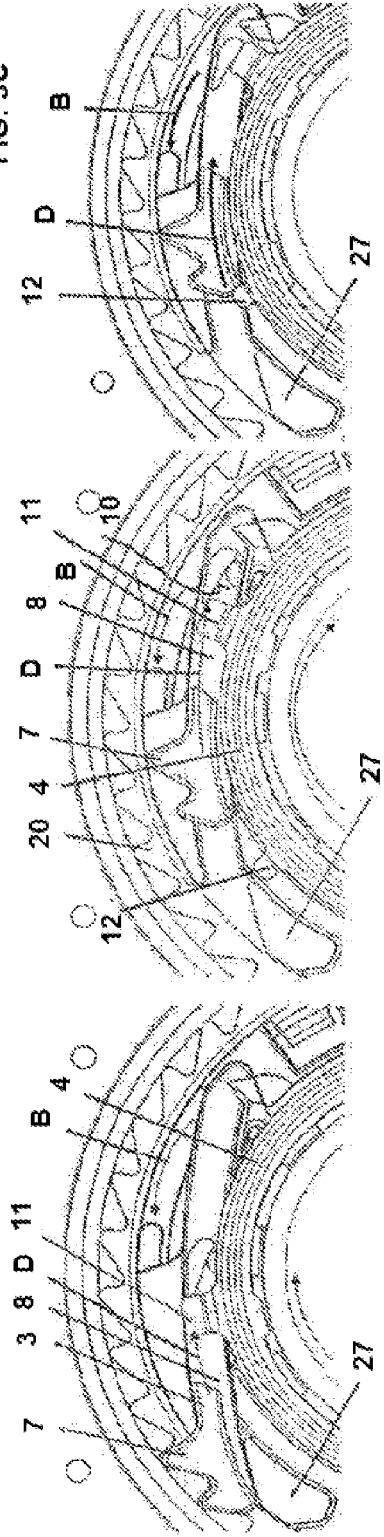

BELT RETRACTOR FOR A SEAT BELT DEVICE OF A MOTOR VEHICLE

CROSS-REFERENCE TO RELATED APPLICATIONS

This application claims the benefit of priority under 35 U.S.C. § 119 to German Patent Application No. 102018211226.6 filed Jul. 6, 2018, the disclosure of which is herein incorporated by reference in its entirety.

FIELD OF THE INVENTION

The present invention relates to a belt retractor for a seat belt device of a motor vehicle.

BACKGROUND

Belt retractors are used in seat belt devices of motor vehicles and serve to wind one end of a seat belt provided for restraining an occupant. The belt retractor is fastened either to the vehicle structure or to a vehicle seat fastened to the vehicle structure or to a bench seat fastened thereto. In its basic structure, the belt retractor has a frame provided for fastening purposes and a belt reel rotatably mounted in the frame, wherein the seat belt can be wound onto the belt reel. The belt reel is spring-loaded in the winding direction via a spring and, in the event of a predetermined belt pull-out acceleration being exceeded or vehicle deceleration, can be blocked by means of a blocking device against a further pulling-out of the seat belt so that in order to reduce the likelihood of serious injuries, the occupant is then restrained before impact on the inner vehicle structure.

In order to reduce the occupant load during restraint, force-limiting devices have proven to be advantageous which, in the event of a blocked belt reel and a predetermined belt pull-out force being exceeded, allow a force-limited rotation of the belt reel in the pull-out direction and thus a force-limited forward displacement of the occupant. Since the thereby enabled reduction of the occupant load is directly related to the forward displacement path available, it has furthermore been found to be advantageous to take up the belt slack present in the seat belt by means of a belt tensioner (or "pretensioner") before activation of the force-limiting device in order to increase the available forward displacement path and to couple the occupant as early as possible to the vehicle deceleration.

In belt tensioners, a distinction is drawn between reversible belt tensioners and irreversible belt tensioners or even performance tensioners. Reversible belt tensioners have a lower tensioning capacity of approximately 100 to 400 N and serve to take up the belt slack in a hazardous situation in preparation for a possible subsequent accident. If no accident occurs subsequently, the seat belt will be slackened again. Electric motors which can be controlled particularly well and reversibly have proven successful for driving the reversible belt tensioners. Irreversible belt tensioners have a higher tensioning capacity of 400 to 1000 N and are only activated when the accident can no longer be avoided, that is to say in an early phase of the accident. The irreversible belt tensioners are thus always activated after the reversible belt tensioners. Pyrotechnic drives which cannot be activated again after their one-time activation have proven themselves as drives for irreversible belt tensioners so that in this case, the entire seat belt device with the irreversible belt tensioner has to be replaced.

In this case, belt tensioners can engage at different positions of the seat belt, for example at the belt buckle, the end fitting or even at the belt retractor. When the belt tensioner is used on the belt retractor, it drives the belt reel abruptly in the winding direction in the event of an activation and thereby takes up the belt slack present in the seat belt. For the purposes of the present invention, the term "belt tensioner" should be understood to mean only those belt tensioners which are arranged on a belt retractor and drive the belt reel. Since the belt reel must basically be able to rotate freely in normal use for buckling up and for unbuckling, the drives of both the reversible belt tensioner and also the irreversible belt tensioner are only connected via couplings to the belt reel in the event of an activation. The couplings should be designed such that they do not ever unintendedly establish a rotational connection, as a result of which the normal use of the belt retractor would be impeded due to a disturbance of the rotational movement of the belt reel caused thereby.

Since the reversible belt tensioner is to be deactivated again in the event that an accident does not subsequently occur and the belt retractor is to be used normally again, the coupling of the reversible belt tensioner must moreover likewise be of a reversible design. Furthermore, the coupling of the reversible belt tensioner must then too be deliberately disengaged when an accident subsequently occurs and the irreversible belt tensioner is activated so that the drive movement of the irreversible belt tensioner is not disturbed by the still engaged coupling of the reversible belt tensioner.

Furthermore, the couplings of the various belt tensioners must be designed such that they automatically establish the rotational connection between the drive and the belt reel when the drive is activated, which can be effected, for example, by friction, by inertial forces or by a control profile. The movement of the coupling is thereby positively controlled by the beginning movement of the drive.

Thus, the couplings are on the one hand required to execute the coupling movement automatically when the drive device is activated but to deliberately not execute the coupling movement in other circumstances in order to prevent an undesired coupling connection.

EP 1 663 737 B1 discloses, for example, a belt retractor having a reversible belt tensioner of the applicant which has a friction-controlled coupling with two coupling pawls and a friction ring. The friction ring has two control arms and is coupled to the coupling pawls in that, in a first exemplary embodiment, the coupling pawls engage with control pins in each case in a slot in a control arm, or in that, in a second exemplary embodiment, the coupling pawls have funnel-shaped recesses in which the control pins engage. The coupling pawls are in each case longitudinally displaceably guided in elongated recesses of a drive wheel drivable by an electric motor. The friction ring itself is clipped into the drive wheel and abuts on a fixed dome of a tensioner cover via friction feet. Furthermore, the belt reel projects with an annular internally toothed extension into an annular recess which radially encloses the coupling pawls of the drive wheel on the outside.

The principle of triggering the coupling movement of the coupling is described in German patent DE 100 59 227 C1 of the applicant and is also realized in the coupling in EP 1 663 737 B1 so that reference is made in this respect to these publications.

In the exemplary embodiment described in EP 1 663 737 B1, the drive wheel is first set in rotation via the electric motor and a gearing. Due to the frictional forces applied via the friction feet, the friction ring is deliberately held back in relation to the drive wheel, as a result of which the coupling pawls mounted displaceably in the recesses of the drive wheel are forced to move outwards and engage in the internal toothing of the extension of the belt reel.

It has been found that, despite the coupling to the friction ring via the control arms, under extreme vibrations, such as during a subsequent activation of an irreversible belt tensioner, the coupling pawls can unintendedly engage with the internal toothing of the extension of the belt reel.

SUMMARY AND INTRODUCTORY DESCRIPTION OF EMBODIMENTS OF THE INVENTION

A feature of embodiments of the invention is therefore to provide a belt retractor of the generic type in which the probability of an undesired engagement of the tensioner coupling is reduced or the control of the coupling and decoupling movement of the tensioner coupling is improved.

In order to achieve the object, a belt retractor with the features described herein is proposed.

According to a feature of embodiments of the invention, it is proposed that the friction ring and/or the coupling pawl has a blocking contour which is positioned in such a way that the coupling pawl abuts thereon after being disengaged from the toothing and is blocked in the direction of a repeated engagement movement into the toothing.

The advantage of the solution according to the invention is that the coupling pawl is blocked by the blocking contour in a parking position against any undesired engagement in the toothing due to, for example, severe vibrations. The coupling pawl is thereby not only controlled in its movement via the control arm of the friction ring but is also blocked in a defined position after and before activation by a positive abutment on the blocking contour. Since this effect is achieved solely by a designed shape of the friction ring and/or the coupling pawl, the function can be implemented without additional parts and almost cost-neutrally during the production of the two parts. The blocking contour is deliberately arranged in such a way that the coupling pawl is blocked only in a defined position, which is referred to here as a parking position, and that it can otherwise carry out the retraction and extension movement without interference. The parking position of the coupling pawl is defined by the arrangement of the blocking contour and the executed relative movement of the coupling pawl in relation to the friction ring or vice versa, the relative movement in turn depending on the frictional forces acting between the friction ring and a stationary counterface of the housing or a part held thereon. Furthermore, the movement of the coupling pawl in relation to the drive wheel and vice versa can also be used. In other words, due to the movement sequence of said parts, the coupling pawl first reaches the blocked position, wherein with this movement sequence, the relative movement of the friction ring, the coupling pawl and the drive wheel can be used in any combination for blocking the coupling pawls in the parking position or for reaching the parking position.

Furthermore, it is proposed that the coupling, realized via the control arm, between the friction ring and the coupling pawl be subject to play, and that the coupling being subject to play allows, in the event of an activation of the belt tensioner, a relative movement of the friction ring and/or the coupling pawl, thereby unblocking the coupling pawl. The advantage of the proposed development is to be seen in the fact that the release of the blocking of the coupling pawl presupposes a slight relative movement of the friction ring and/or of the coupling pawl; in other words, the belt tensioner must therefore be deliberately activated in order to release the blocking of the coupling pawl. Furthermore, the activation of the belt tensioner is not blocked because the blocking is first released in a first step by the relative movement, and the coupling pawl is only subsequently pushed into the engaged position in the toothing in order to couple the drive wheel to the belt reel.

Furthermore, the friction ring and/or the coupling pawl can have a control contour which pushes the coupling pawl into the blocked position during the relative movement in relation to the friction ring. The movement of the coupling pawl is thus controlled, and the blocked position or parking position of the coupling pawl can thereby also be arranged, for example, at a lateral offset from the displacement path of the coupling pawl.

In this case, the control contour can, for example, take the form of a ramp. Starting from the linear displacement path, the ramp forces the coupling pawl into a continuous pivoting or offset movement, wherein the movement of the coupling pawl cannot be snagged in particular by steps or edges on the control contour. The controlled movement of the coupling pawl into the blocked position is thus a continuous movement. If the ramp is provided on the friction ring, it is oriented such that it rises against the direction of movement of the friction ring during the relative movement of the coupling pawl into the blocked position. If the ramp is arranged on the coupling pawl, it is on the other hand oriented such that it rises against the direction of movement of the coupling pawl during the relative movement into the blocked position of the coupling pawl.

Furthermore, the blocking contour can take the form of a finger which projects from the friction ring and on which the coupling pawl abuts in the blocked position. The projecting finger effectively forms a positive stop for the coupling pawl, by means of which stop the movement of the coupling pawl is reliably blocked. In this case, the finger is preferably positioned on the friction ring in such a way that the coupling pawl abuts on the finger in the direction of engagement in the toothing. This can be realized, for example, by an end-face abutment of the coupling pawl on the finger.

Furthermore, the blocking contour can alternatively or additionally be provided on the coupling pawl, wherein the drive wheel in this case preferably has a counter-contour on which the coupling pawl abuts in the blocked position with the blocking contour. If the blocking contour is provided only on the coupling pawl, the friction ring does not have to be modified; the coupling pawl is blocked solely via the coupling pawl itself, the coupling pawl itself effectively catches on the blocking contour on the counter-contour of the drive wheel, wherein the catching or blocking can in addition be initiated or forced by a control contour provided on the coupling pawl or on the friction ring and interacting with a counterface. If a blocking contour is provided both on the coupling pawl and on the friction ring, blocking can be further improved and, in particular, a redundancy can be provided if the blocking is not to be effected via one of the blocking contours.

It is furthermore proposed that the friction ring be created by a multiply shaped stamped part made of a metal sheet. The advantage of this solution is that the blocking contour can be produced during the stamping and shaping of the friction ring with very low additional costs incurred only as a result of the additional shaping steps.

Furthermore, the friction ring can also take the form of a plastic injection-molded part, wherein the blocking contour can also be formed during the injection-molding of the friction ring without any additional costs.

Furthermore, the coupling pawl can preferably be formed by a metal sintered part so that even a very complex shape with, for example, a blocking contour or various control contours can also be produced without additional finishing and in particular without a subsequent machining operation.

BRIEF DESCRIPTION OF THE DRAWINGS

The invention is explained below on the basis of various preferred embodiments with reference to the accompanying figures. These drawings show:

FIGS. 3A-3F show the section of the drive wheel with the coupling pawl in various positions during the retraction and extension movement;

DETAILED DESCRIPTION

Only the individual components of the tensioner coupling are shown in the figures. The belt retractor as such is not shown but naturally comprises the usual components and in its basic structure corresponds to the seat belt retractors described in documents DE 100 59 227 C1 and EP 1 663 737 B1.

In its basic structure, the belt retractor has a belt reel which is mounted rotatably in a frame fixable in the vehicle and serves for winding a seat belt of the seat belt device. A drive device, for example in the form of an electric motor, is mounted on the frame and can be brought into a drive connection with the belt reel by means of the tensioner coupling described below. Furthermore, the belt retractor can additionally have a force-limiting device, an irreversible belt tensioner and various additional functions.

Figure 1:
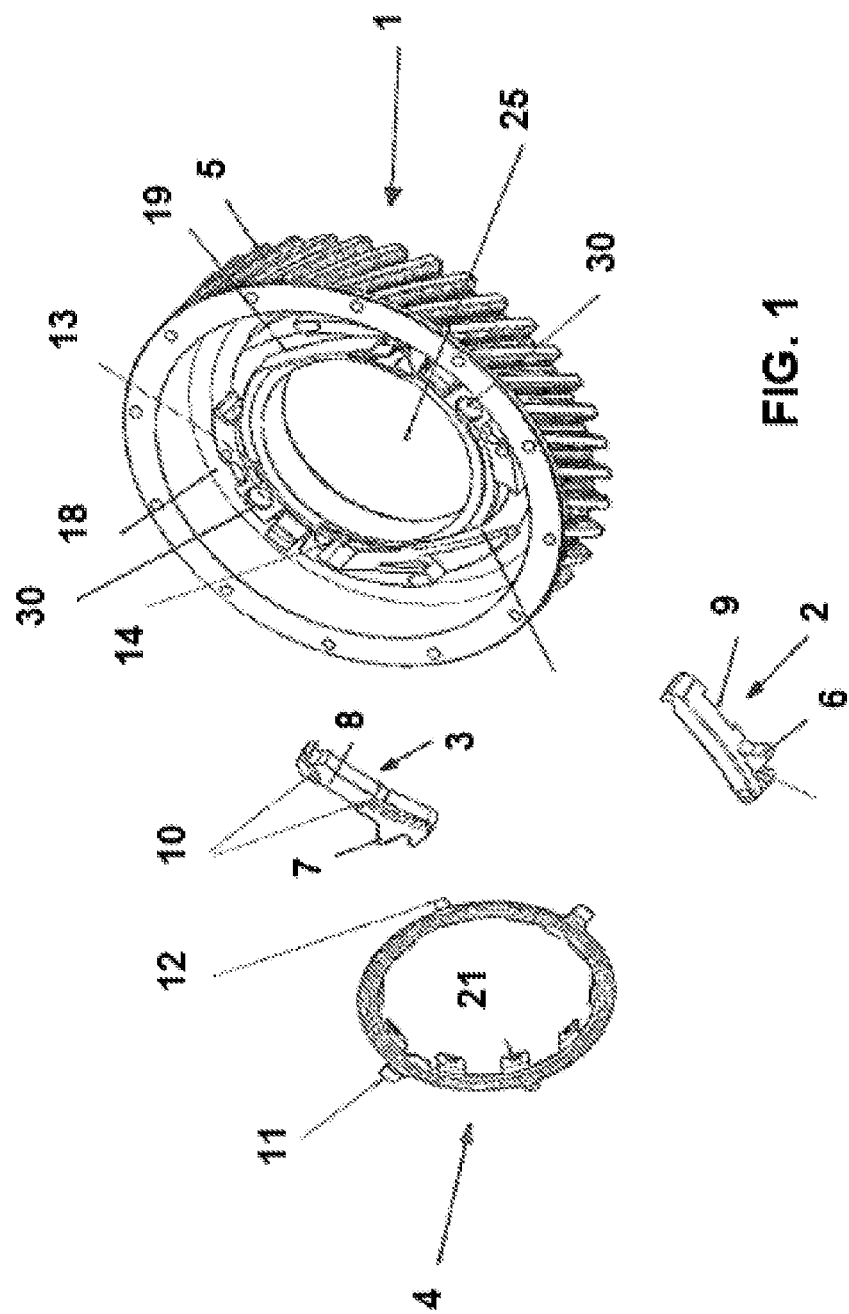
FIG. 1 is a drive wheel with a friction ring and coupling pawls as individual components in an exploded view.
Figure 2A:
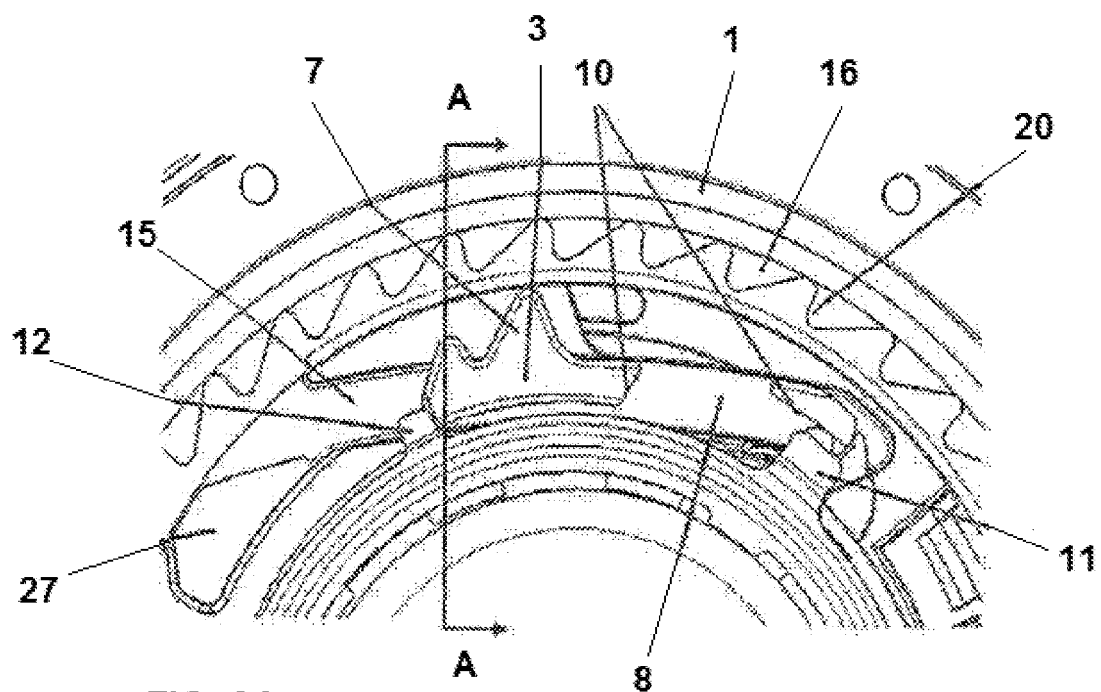
FIG. 2A shows a section of the drive wheel with a blocked coupling pawl.
Figure 2B:
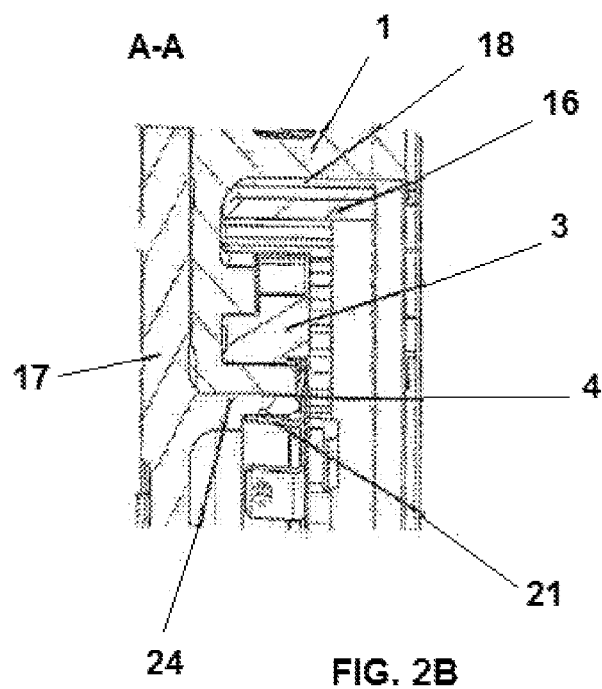
FIG. 2B is a cross-sectional view taken along line A-A from FIG. 2A.

The belt reel, not shown, has a hood-shaped extension 16 which is connected in a rotationally fixed manner or is also integrally formed thereon and has a radially inner toothing 20 which can be seen, for example, in FIG. 2A.

The tensioner coupling comprises as basic components an externally toothed drive wheel 1, two coupling pawls 2 and 3, a friction ring 4 and a tensioner cover 17 which can be seen in FIG. 2A. When activated via a gearing, the drive device drives the externally toothed drive wheel 1 in order to tension the seat belt in the winding direction A and can be understood as included in the illustration (see FIGS. 3A-3F).

The externally toothed drive wheel 1 has a central opening 25, an annular recess 18 and two channel-shaped recesses 15 and 19 which are provided within the annular recess 18 and which respectively have two guide surfaces which are linear at least in sections. Two coupling pawls 2 and 3 are guided in a linearly displaceable manner in the channel-shaped recesses 15 and 19 and respectively have teeth 6 and 7 on their radially outer sides in the installed position for engaging in the toothing 20 of the extension 16 of the belt reel. Furthermore, the coupling pawls 2 and 3 respectively have a funnel-shaped recess 8, 9 on the side faces facing the belt reel or the extension 16, said recesses having two opposite side walls 10 which in the installed position extend towards one another toward the radially outer side.

The friction ring 4 has two control arms 11 arranged opposite one another at an angle of 180 degrees and two blocking contours 12 likewise arranged opposite one another at an angle of 180 degrees in the form of radially outwards projecting fingers. Furthermore, the friction ring 4 has on its radially inner side a plurality of spaced, axially directed friction feet 21 arranged on a single diameter.

Figure 13:
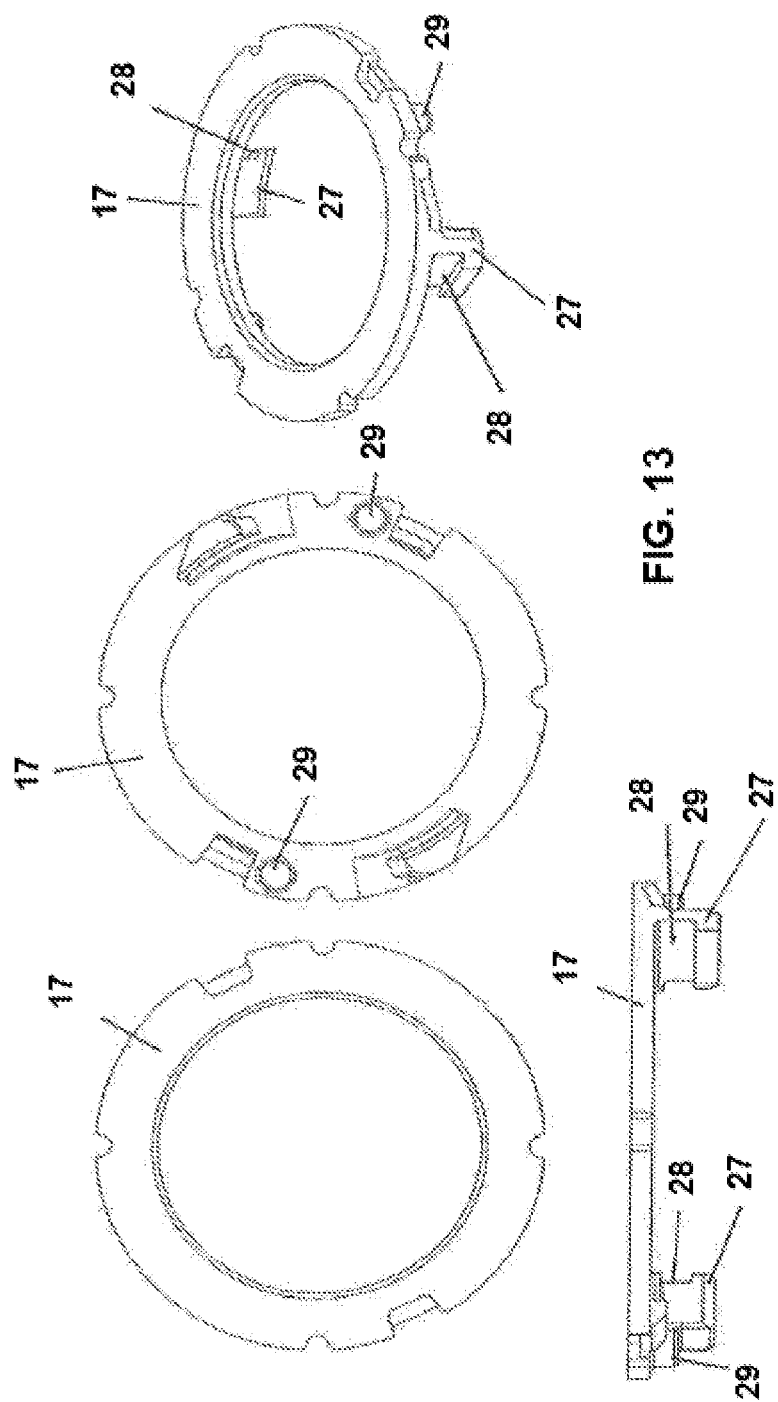
Figure 14C:
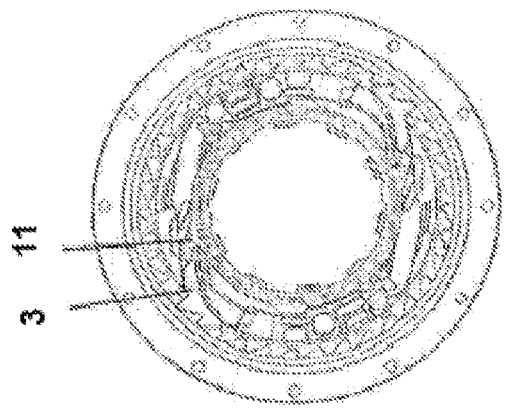
Figure 14B:
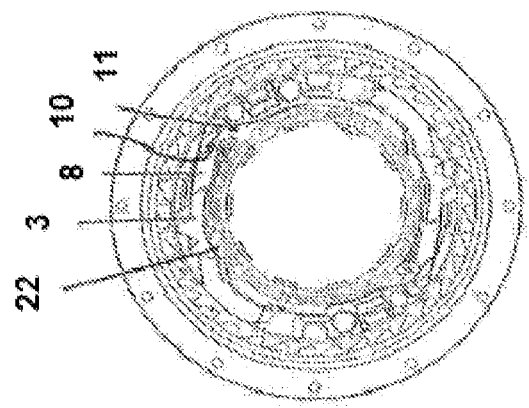
Figure 14A:
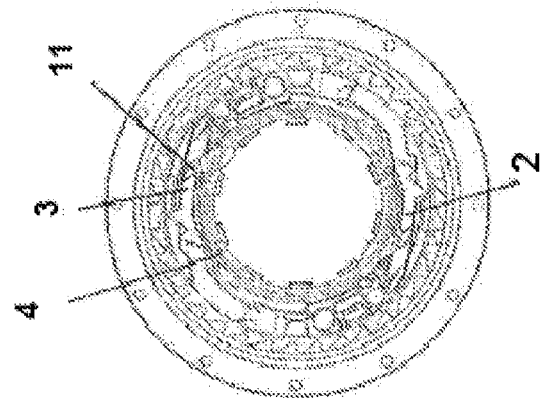

The tensioner coupling is assembled by first mounting a tensioner cover 17 from the rear side onto the drive wheel 1, an annular extension 24 being inserted into the central opening 25 of the drive wheel 1 and the fixing pins 29 that can be seen in FIG. 13 being inserted into one opening 30 each in the process. Next, the coupling pawls 2 and 3 are inserted into the recesses 15 and 19, and the friction ring 4 is mounted such that its friction feet 21 abut on the inside of the annular extension 24.

The friction ring 4 is mounted in the assembled initial position in such a way that the coupling pawls 2 and 3 are arranged in a retracted position and do not engage with their teeth 6 and 7 in the toothing 20, as can be seen in FIG. 2A. The coupling pawls 2 and 3 also abut with their end faces on the fingers of the friction ring 4 so that they are blocked from any unintended extension movement. The tensioner coupling is thus open and the belt reel of the belt retractor can rotate freely. The control arms 11 are located at the entrance of the funnel-shaped recesses 8 and 9, radially below the side walls 10 of the funnel-shaped recesses 8 and 9 arranged at the rear end of the coupling pawls 2 and 3.

Figure 4B:
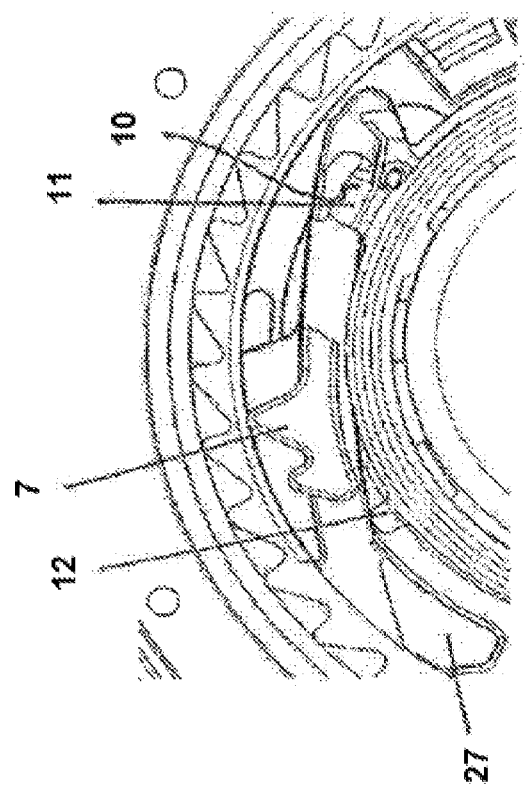
FIGS. 4A and 4B show the drive wheel with the coupling pawl arranged in a blocked position in various positions under the action of external forces.
Figure 4A:
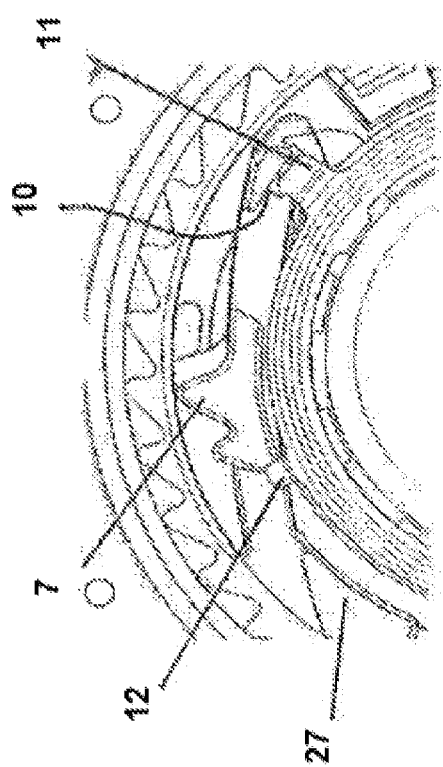

In this blocked position of the coupling pawls 2 and 3, due to their end-face abutment on the blocking contour 12 formed by the fingers of the friction ring 4 and due to the limiting of the deflection of the coupling pawls 2 and 3 by the control arms 11 of the friction ring 4 abutting on the side walls 10, said coupling pawls do not with their teeth 7 and 6 engage in the toothing 20 of the extension 16 either by a leftward longitudinal displacement in the figure or as a result of omnidirectional vibrations, as can be seen in the right-hand illustration in FIG. 4B. The movement of the coupling pawls 2 and 3 is thus effectively limited at two ends, namely at the front end by the blocking contour 12 and at the rear end by the side wall 10, and the coupling pawls 2 and 3 are prevented from unintendedly engaging with the toothing 20. If the tensioner coupling is used to connect a reversible belt tensioner to the belt reel, the solution according to the invention can in particular prevent the coupling pawls 2 and 3 from engaging with the toothing 20 during a subsequent activation of an irreversible belt tensioner and thereby from interfering with the irreversible tensioning movement of the seat belt.

From left to right in the upper illustrations, FIGS. 3A-3F show the tensioner coupling in various positions of the friction ring 4 and the coupling pawl 3 in an initial phase of the activation of the belt tensioner drive up until the complete engagement of the coupling pawl 3 in the toothing 20. From left to right in the lower illustrations, the same coupling pawl 3 can be seen in various positions from the engaged position up to a parking position in a final phase of the activation of the belt tensioner drive.

At the beginning of the activation of the belt tensioner, the coupling pawl 3 is in a parking position in which it is in a retracted position and not engaging in the toothing 20 with its teeth 7. This position in the top left-hand illustration in FIG. 3A corresponds to the position shown in FIG. 2A and reference is made to the description associated with FIG. 2A.

When the belt tensioner is activated, the drive wheel 1 is driven in the arrow direction A. The friction ring 4 is deliberately coupled with some play in the recess 8 to the coupling pawl 3 via the control arm 11. As a result, during the initial phase of the drive movement of the drive wheel 1, the friction ring 4 executes a relative movement in the recess 8 toward the drive wheel 1 in the arrow direction C, during which it does not move the coupling pawl 3 until it abuts laterally with the control arm 11 on the front side wall 10 of the recess 8 facing the teeth 7. At the same time, the blocking contour 12 in the form of the projecting finger is thereby moved away from the end face of the coupling pawl 3 so that the coupling pawl 3 is unblocked. The play of the friction ring 4 in relation to the coupling pawl 3 is deliberately designed such that the friction ring 4 can be moved starting from the blocking parking position when the coupling pawl 3 is stationary up until the blocking of the coupling pawl 3 is intentionally lifted before the friction ring 4 starts to control the extension movement of the coupling pawl 3 via the control arm 11. Following this, the friction ring 4 pushes the coupling pawl 3 radially outwards out of the recess 15 by means of the control arm 11 until said coupling pawl engages with its teeth 7 in the toothing 20 and thereby drives the belt reel via the extension 16 in the winding direction, as can be seen in the top right-hand illustration in FIG. 3C.

After the tensioning movement has taken place, the tensioning of the seat belt is canceled again if no accident occurs, and the seat belt is intentionally slackened again by the drive device of the belt tensioner, that is, the electric motor, driving the drive wheel 1 to rotate by a small angle of rotation in the opposite direction of rotation, that is, in the arrow direction B. This movement can be seen in the lower illustrations of FIGS. 3D-3F. Due to the rotational movement in the arrow direction B, the drive wheel 1 executes a relative movement in relation to the friction ring 4 or, in other words, the friction ring 4 executes a relative rotational movement in the arrow direction D until it abuts with the control arm 11 laterally on the rear side wall 10 of the recess 8, as can be seen in the bottom left-hand illustration in FIG. 3D. Afterwards, the coupling pawl 3 is pulled out of the toothing 20 by means of the control arm 11 until it is located in the position shown in the bottom middle illustration in FIG. 3E and the belt reel with the extension 16 can rotate freely in relation to the coupling pawl 3. During the further relative rotational movement of the friction ring 4 in relation to the drive wheel 1, the control arm 11 abuts under the rear side face 10 of the recess 8, and the blocking contour 12 in the form of the finger reaches a blocking position in which it abuts on the end face of the coupling pawl 3 and then pushes it into the final parking position during the further relative movement. The coupling pawl 3 in the parking position is then so blocked at the front end against undesired extension by the finger of the friction ring 4 and at the rear end against an undesired deflection by the front side of the control arm 11 abutting below the rear side face 10 of the recess 8 that it cannot unintendedly engage in the toothing 20 with its teeth 7.

The description of the coupling and decoupling process has been given in FIGS. 2A and B to 4A and B solely on the basis of the coupling pawl 3 but it naturally also applies identically to the second coupling pawl 2 lying opposite. Furthermore, for ease of understanding, the description of the movement sequence has been given on the basis of a drive wheel 1 standing in an unchanged position, with the friction ring 4 instead being rotated in relation to the drive wheel 1. In reality, of course, the drive wheel 1 is also rotated and the friction ring 4 is forced to move in relation to the drive wheel 1 by the frictional, end-face abutment on the extension 16 and on the tensioner cover 17. Assuming a stationary drive wheel 1, however, this relative movement corresponds to the depicted relative movement of the friction ring 4 in the arrow directions C and D.

Further exemplary embodiments of the developed tensioner coupling are shown in FIGS. 5 to 15, these exemplary embodiments only being described with regard to the features that differ from the exemplary embodiment in FIGS. 1 to 4B.

Figure 5:
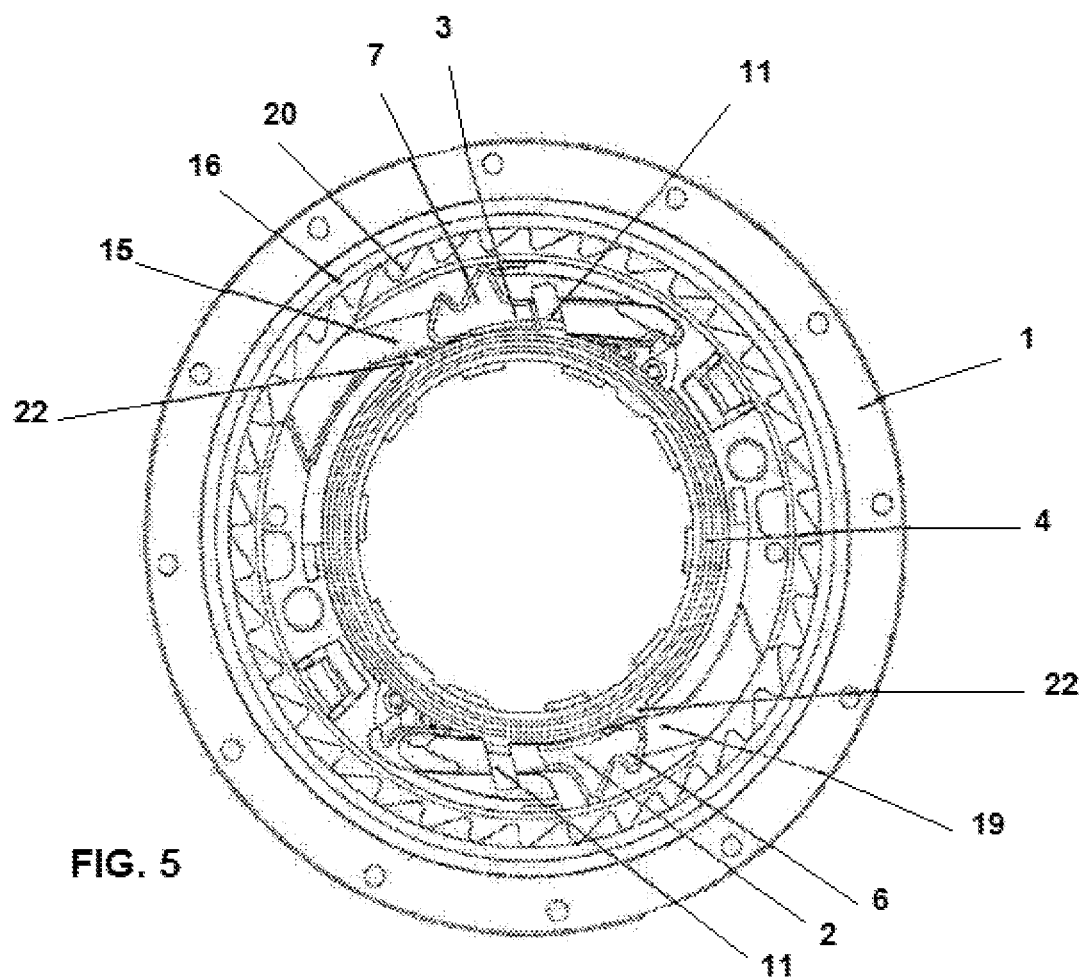
FIGS. 5 and 6 show a drive wheel with a friction ring and two coupling pawls according to a second exemplary embodiment.
Figure 6:
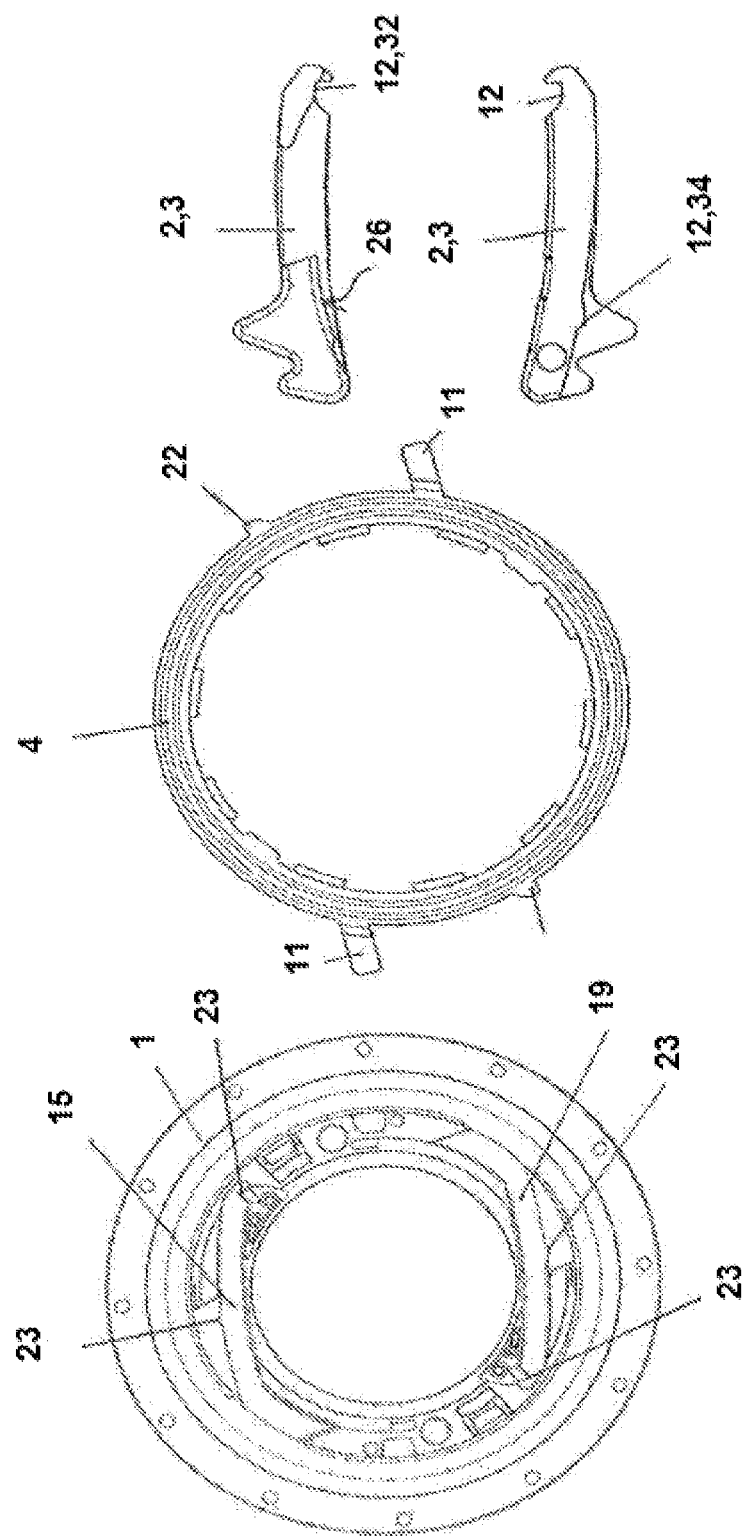

In the exemplary embodiment in FIGS. 5 and 6, the coupling pawls 2 and 3 each have a blocking contour 12 in the form of a cam 34 projecting radially outwards and a hook 32 provided at the rear end. The drive wheel 1 has a counter-contour 23 which is formed by a recess in each case with a shape, corresponding to the cams 34, on the radially outer guide surfaces of the recesses 15 and 19 and by two projections having a shape corresponding to the hooks 32 and extending into the recesses 15 and 19. Furthermore, in addition to the control arms 11, the friction ring 4 has, instead of the blocking contour 12 shown in the exemplary embodiment in FIGS. 1 to 4B, a control contour 22 in the form of ramps arranged at a distance from the control arms 11 and rising against the relative rotational movement of the friction ring 4. On their inner sides facing the friction ring 4, the coupling pawls 2 and 3 each have a contour face 26 on which the friction ring 4 with the ramps abuts during the retraction movement into the parking position. As a result, the coupling pawls 2 and 3 are continuously raised and secured to the respective counter-contour 23 of the drive wheel 1 by means of the blocking contour 12 formed by the cams 34 and the hooks 32, and blocked in the parking position. In order to release the blocking of the coupling pawls 2 and 3, the friction ring 4, in the same way as shown in the exemplary embodiment in FIGS. 1 to 4B, executes a small relative rotational movement in relation to the stationary coupling pawls 2 and 3 in the opposite direction of rotation, during which rotational movement the coupling pawls 2 and 3 with the blocking contour 12 disengage from the respective counter-contour 23. Here, the control arms 11 are inclined in the direction of the teeth 6 and 7 of the coupling pawls 2 and 3, i.e. in the extension direction of the coupling pawls 2 and 3. The front side faces 10 of the recesses 8 and 9 are also inclined, namely at an angle of less than 90 degrees to the inner side of the coupling pawls 2 and 3. As a result, during the extension movement, the coupling pawls 2 and 3 are guided via the control arms 11 in each case by a forwards and radially slightly inwards directed thrust force, whereby the tendency of the radially outwards lifting of the coupling pawls 2 and 3 can be counteracted and guidance of the coupling pawls 2 and 3 as such can be improved.

Figure 7:
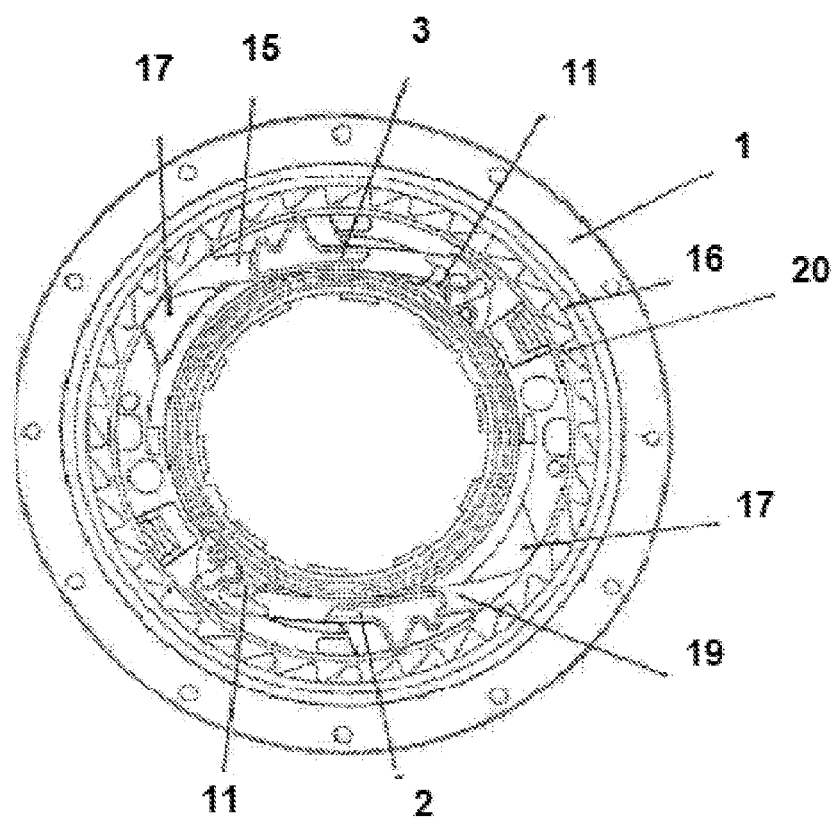
FIGS. 7 and 8 show a drive wheel with a friction ring and two coupling pawls according to a third exemplary embodiment.
Figure 8:
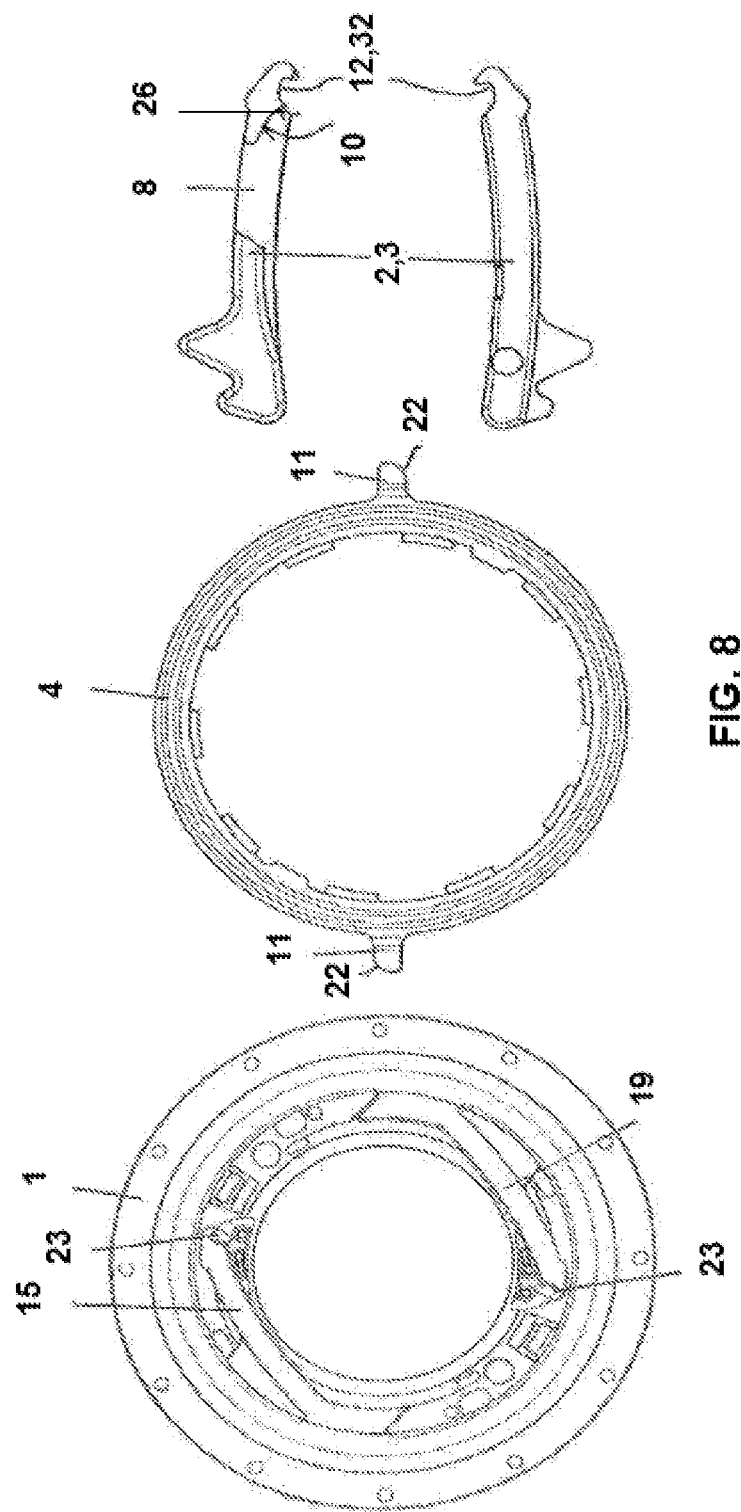
Figure 9:
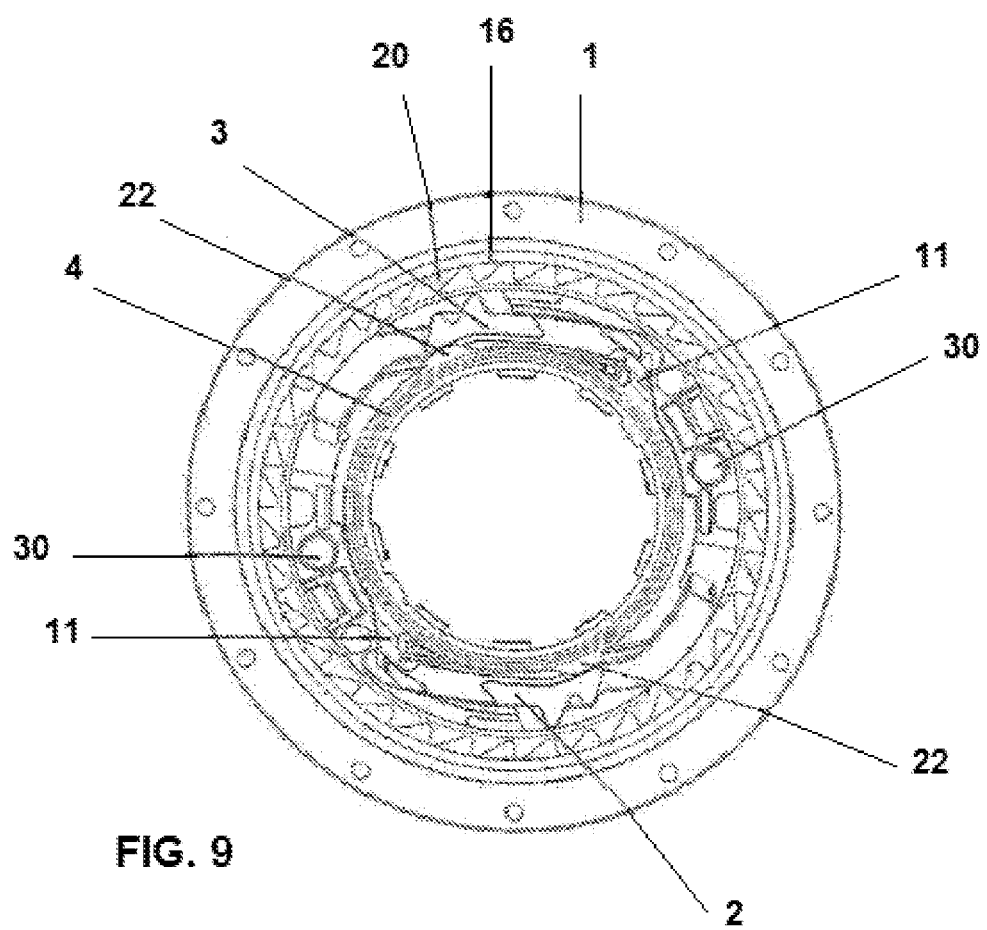
FIGS. 9 to 15 show a drive wheel with a friction ring and two coupling pawls according to a fourth exemplary embodiment.
Figure 10:
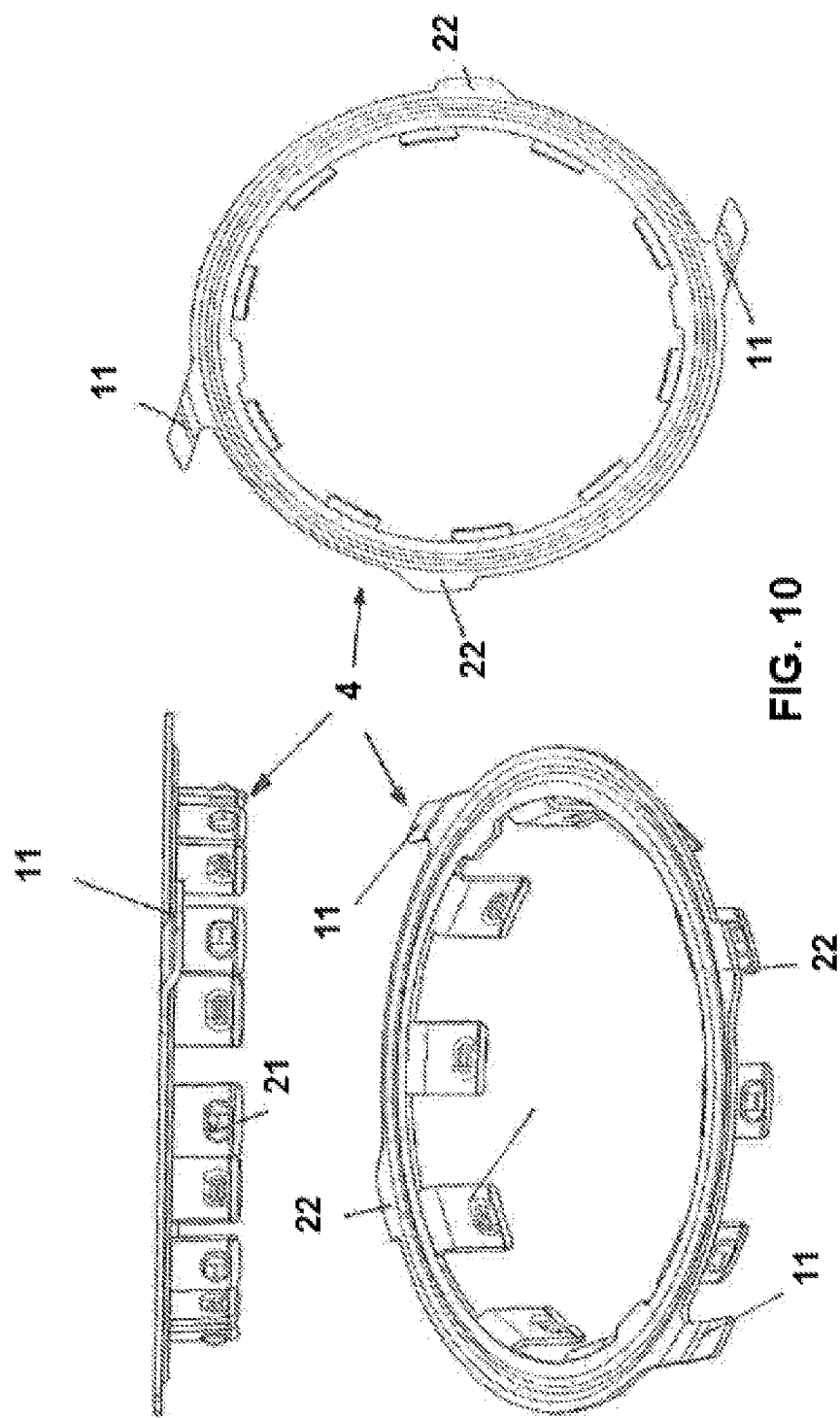
Figure 11:
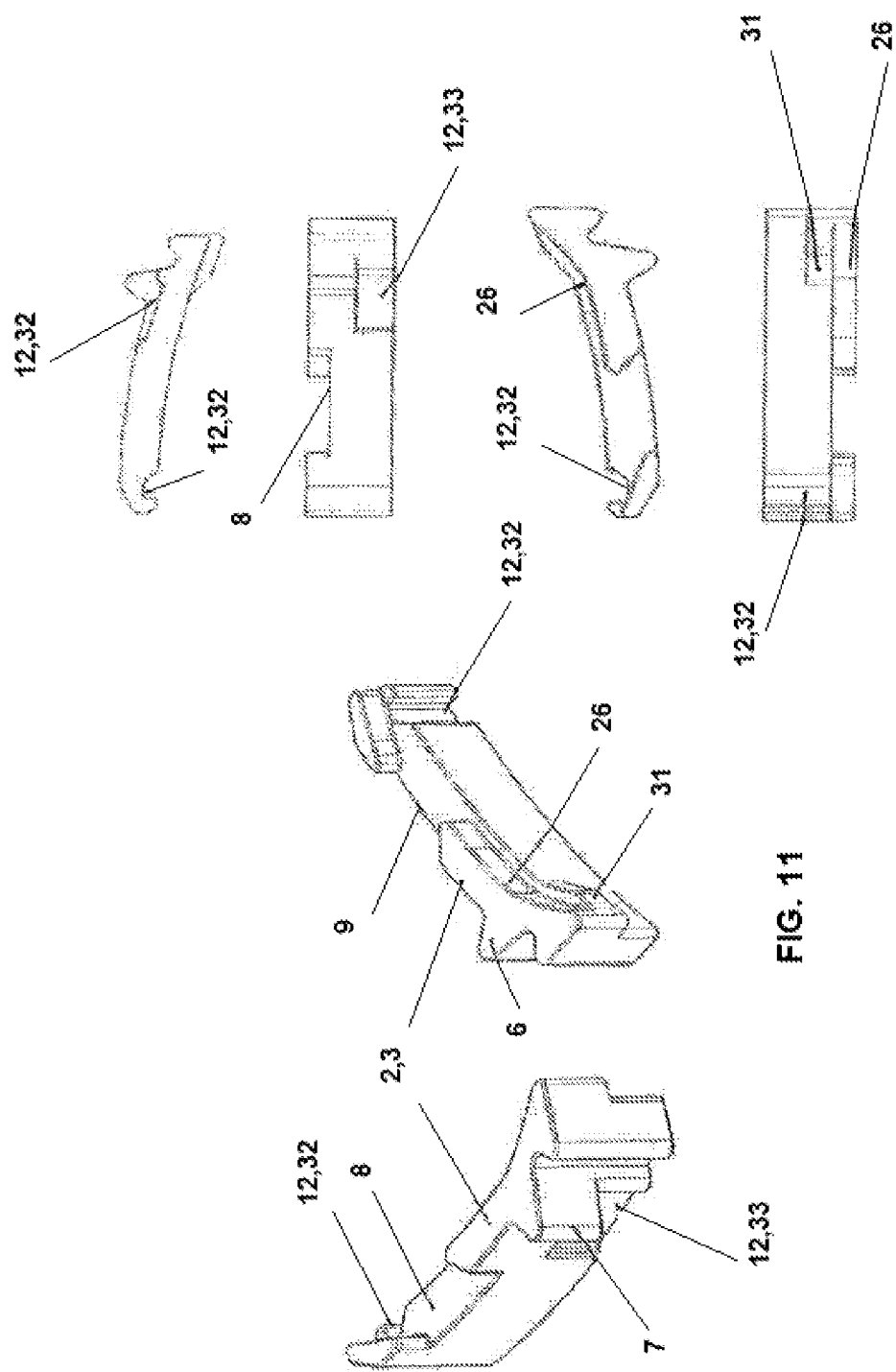
Figure 12:
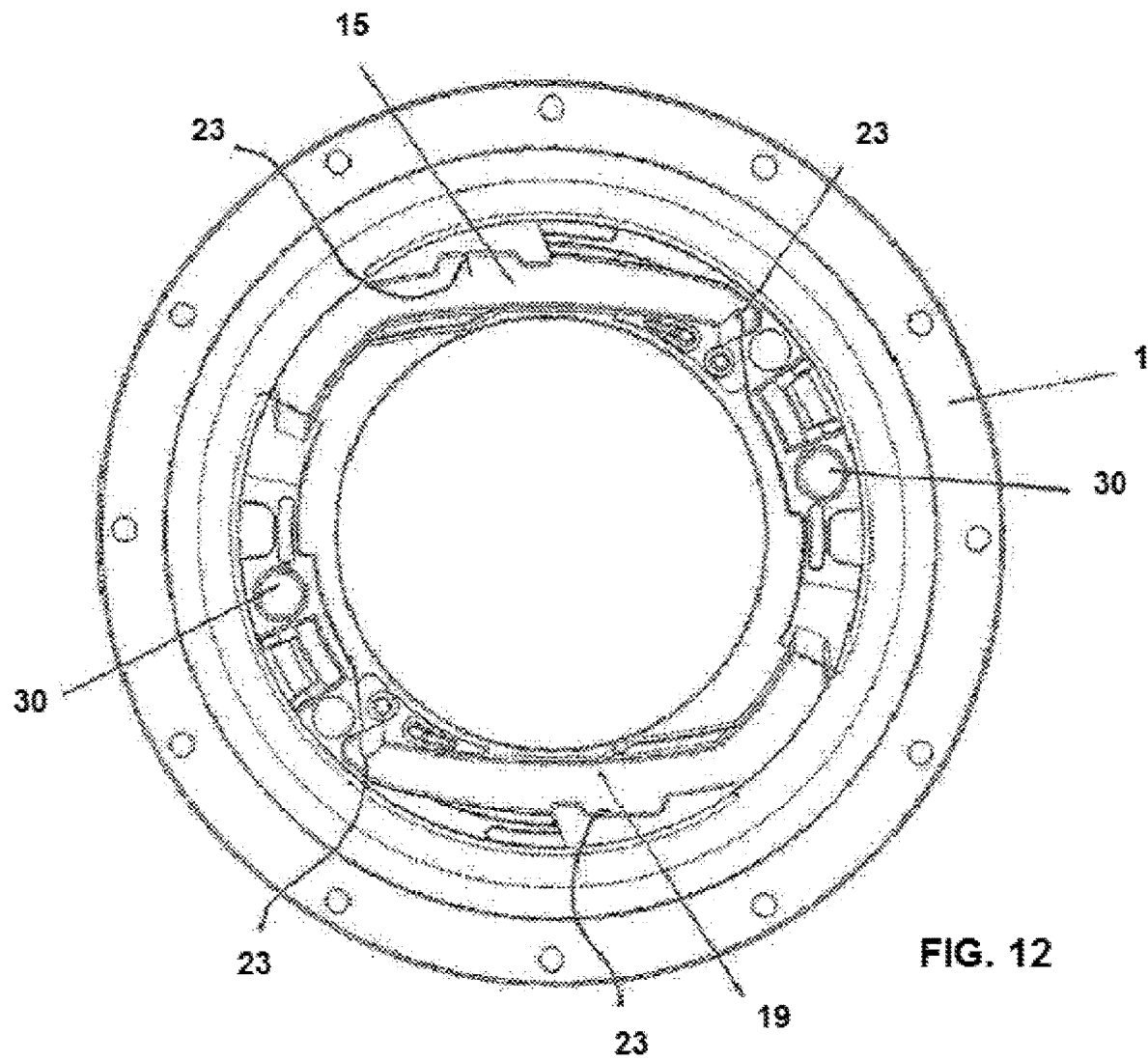

FIGS. 7 and 8 show an exemplary embodiment which is further simplified in comparison with the exemplary embodiment in FIGS. 5 and 6 and in which the control contour 22 on the friction ring 4 takes the form of ramps integrally formed on the control arms 11. Here, the blocking contour 12 is formed solely by the hooks 32 provided at the rear ends of the coupling pawls 2 and 3, said hooks blocking the coupling pawls 2 and 3 in the parking position in an identical way to the exemplary embodiment in FIGS. 5 and 6. The coupling pawls 2 and 3 each have a contour face 26 on the rear side faces 10 of the recesses 8 and 9 on which the friction ring 4 abuts with the control contours 22 provided on the control arms 11, whereby the coupling pawls 2 and 3 are raised at their ends and lifted over the counter-contour 23 formed by the projections until their hooks 32 engage behind the projections in a blocking manner.

In FIGS. 9 to 15, a further exemplary embodiment of the invention can be seen, in which two additional control contours 22 are also provided on the friction ring 4 in addition to the control arms 11 in a similar way to the exemplary embodiment in FIGS. 5 and 6. Here, the control contours 22 are realized in the form of radially projecting projections with two inclined faces or ramps which rise toward one another to create a roof shape. The control arms 11 are inclined in the direction of the extension movement of the coupling pawls 2 and 3 in a similar way to the exemplary embodiment in FIGS. 5-and 6. The side faces 10 of the recesses 8 and 9 which are in front in the extension direction of the coupling pawls 2 and 3 are inclined in the same way, namely in the direction of the teeth 6 and 7, so that they are at an angle of less than 90 degrees to the radially inner guide surfaces of the coupling pawls 2 and 3. Furthermore, the lower sides of the coupling pawls 2 and 3 each have a contour face 26 on which the friction ring 4 with the control contour 22 abuts, as a result of which the coupling pawls 2 and 3 execute a movement sequence predetermined by the shape of the control contours 22 and the contour face 26 during the extension and retraction movement. On each of the coupling pawls 2 and 3, a blocking contour 12 is provided in the form of a hook 34 provided at the rear end and in the form of a depression 33 provided on the upper side. In addition, an elongated lug 31 aligned in the displacement direction of the coupling pawls 2 and 3 is provided on the lower sides of the coupling pawls 2 and 3.

In FIG. 13, the tensioning cover 17 can be seen as a single component having two axially projecting fixing pins 29 with which the tensioning cover 17 can be fixed in openings 30 of the tensioning drive wheel 1 that are of corresponding shape and identically arranged. In addition, two projecting guide blocks 27 of triangular cross-section are provided on the tensioner cover 17 and in the mounted position of the tensioner cover 17 engage in corresponding free spaces, which adjoin the recesses 15 and 19 of the drive wheel 1 and thereby form at least a portion of the guide surfaces for the coupling pawls 2 and 3. On the sides which form the guide surfaces for the coupling pawls 2 and 3, the guide blocks 27 are each provided with a guide groove 28 in which the coupling pawls 2 and 3 engage with their lugs 31 in the corresponding movement phase shortly before and during engagement in the toothing 20 so that the coupling pawls 2 and 3 are additionally guided perpendicularly, laterally to the direction of movement, and cannot be deflected laterally. This additionally ensures that the coupling pawls 2 and 3 do not unintendedly disengage from the toothing 20.

On the guide surfaces of the recesses 15 and 19, the drive wheel 1 has a counter-contour 23 in the form of a step provided radially on the outside and a projection projecting into the recesses 15 and 19. In a position of the retraction movement, the coupling pawls 2 and 3 abut with their control face 26 on the control contour 22 of the friction ring 4 and are thereby fixed with the blocking contour 12 at the counter-contour 23 of the drive wheel 1 so that they are then blocked against an unintended extension movement or an unintended engagement in the toothing 20.

Figure 15:
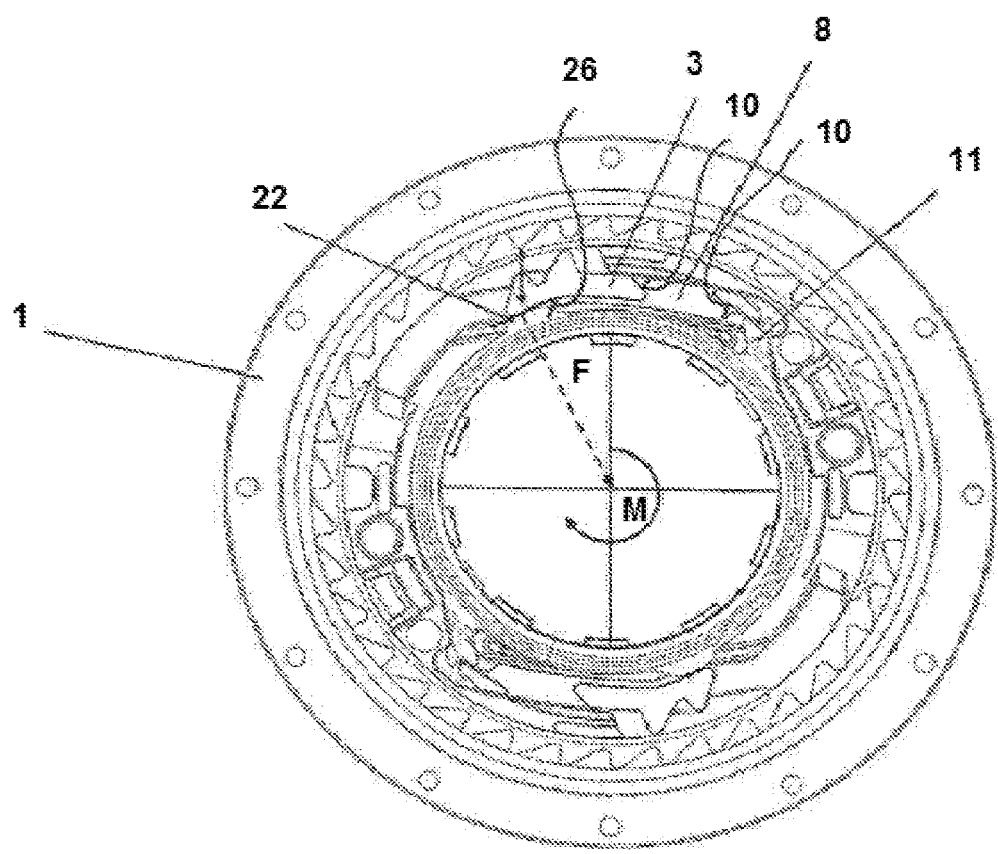

FIG. 15 shows the drive wheel 1 with the coupling pawl 3 blocked in the parking position. The coupling pawl 3 abuts with its contour face 26 on the outer surface of the control contour 22 and is supported at the rear side face 10 of the recess 8 by the upper side of the control arm 11. In the event of vibrations acting on the coupling pawl 3, the coupling pawl 3 exerts a slightly eccentric force F via the contour face 26 on the friction ring 4, as a result of which a torque M acting clockwise in the illustration is applied thereon. By this torque M, the friction ring 4 with the control contour 22 is pushed in the direction of the recess 8 of the coupling pawl 3 and the clamping force applied to the counter-contour 23 via the blocking contour 12 is simultaneously increased. As a result, when vibrations occur, the coupling pawl 3 effectively clamps itself firmly in place and cannot shake loose out of the parking position.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a seat belt device of a motor vehicle comprising,
a rotatably mounted belt reel onto which a seat belt of the seat belt device can be wound, and a belt tensioner with a drive wheel which drives the belt reel in a winding direction in an event of an activation of the belt tensioner, and a positively controlled tensioner coupling transferring a drive movement from the drive wheel onto the belt reel, with at least one coupling pawl which is mounted displaceably on the drive wheel and which can be moved into and out of engagement with a toothing rotationally fixed in relation to the belt reel in order to establish and disconnect a rotational connection of the drive wheel with the belt reel, and a friction ring which has a control arm that is coupled with the coupling pawl,
wherein in the event of the activation of the belt tensioner, the friction ring performs a relative movement in relation to the drive wheel that is forced by frictional forces and, by the relative movement, controls via the control arm the movement of the coupling pawl into engagement and out of engagement with the toothing, wherein the friction ring or the coupling pawl has a blocking contour, which is positioned such that the coupling pawl abuts thereon after the disengaging movement out of the toothing and is blocked in the direction of a repeated engagement movement into the toothing.

2. The belt retractor according to claim 1 further comprising, the coupling between the friction ring and the coupling pawl realized via the control arm is subject to a motion, and when the belt tensioner is activated, the coupling subject to the motion allows a relative movement of the friction ring or of the coupling pawl, thereby unblocking the coupling pawl.

3. The belt retractor according to claim 2 further comprising, the friction ring or the coupling pawl has a control contour which pushes the coupling pawl into a blocked position during the relative movement in relation to the friction ring.

4. The belt retractor according to claim 3 further comprising, the control contour is formed by a ramp.

5. The belt retractor according to claim 1 further comprising, the friction ring or the coupling pawl has a control contour which pushes the coupling pawl into a blocked position during the relative movement in relation to the friction ring.

6. The belt retractor according to claim 5 further comprising, the control contour is formed by a ramp.

7. The belt retractor according to claim 1 further comprising, the blocking contour is in the form of a finger which projects from the friction ring and on which the coupling pawl abuts in a blocked position.

8. The belt retractor according to claim 1 further comprising, the blocking contour is provided on the coupling pawl, and the drive wheel has a counter-contour on which the coupling pawl abuts in a blocked position with the blocking contour.

9. The belt retractor according to claim 1 further comprising, in that the friction ring is formed by a multiply shaped stamped part made of a metal sheet.

10. The belt retractor according to claim 1 further comprising, the friction ring is formed by a plastic injection-molded part.

11. The belt retractor according to claim 1 further comprising, the coupling pawl is a metal sintered part.

* * * * *